United States Patent
Vohra et al.

(10) Patent No.: US 9,833,735 B2
(45) Date of Patent: *Dec. 5, 2017

(54) METHOD FOR REMOVAL OF SULFUR-BASED GAS

(71) Applicant: KING FAHD UNIVERSITY OF PETROLEUM AND MINERALS, Dhahran (SA)

(72) Inventors: Muhammad Shariq Vohra, Dhahran (SA); Bashir Alhaji Labaran, Thoqbah (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 160 days.

This patent is subject to a terminal disclaimer.

(21) Appl. No.: 14/983,438

(22) Filed: Dec. 29, 2015

(65) Prior Publication Data
US 2016/0279558 A1 Sep. 29, 2016

Related U.S. Application Data

(60) Provisional application No. 62/137,774, filed on Mar. 24, 2015.

(51) Int. Cl.
| | | |
|---|---|---|
| *B01D 53/04* | (2006.01) | |
| *B01J 20/20* | (2006.01) | |
| *B01J 20/28* | (2006.01) | |
| *B01J 20/30* | (2006.01) | |

(52) U.S. Cl.
CPC ......... *B01D 53/0423* (2013.01); *B01D 53/04* (2013.01); *B01J 20/20* (2013.01); *B01J 20/28004* (2013.01); *B01J 20/3071* (2013.01); *B01J 20/3078* (2013.01); *B01D 2253/102* (2013.01); *B01D 2253/304* (2013.01); *B01D 2253/306* (2013.01); *B01D 2257/302* (2013.01); *B01D 2257/304* (2013.01)

(58) Field of Classification Search
CPC ............... B01D 53/04; B01D 53/0423; B01D 2253/102; B01D 2253/304; B01D 2253/306; B01D 2257/302; B01D 2257/304; B01J 20/20; B01J 20/28004; B01J 20/3071; B01J 20/3078
USPC ............. 96/108; 95/136, 137, 901; 585/820; 423/244.01, 230; 208/208 R
See application file for complete search history.

(56) References Cited

U.S. PATENT DOCUMENTS

| | | | | |
|---|---|---|---|---|
| 4,528,281 | A * | 7/1985 | Sutt, Jr. .................. | B01D 15/00 210/660 |
| 8,992,670 | B1 * | 3/2015 | Vohra .................... | B01D 15/265 502/400 |
| 2007/0000385 | A1 * | 1/2007 | Stouffer ............... | B01D 53/508 95/136 |
| 2008/0236389 | A1 * | 10/2008 | Leedy .................... | B01D 53/02 95/95 |
| 2011/0229395 | A1 * | 9/2011 | Al-Zeghayer ...... | B01D 53/8668 423/245.1 |
| 2013/0089738 | A1 * | 4/2013 | Al-Zahrani ............. | C01B 31/10 428/402 |

FOREIGN PATENT DOCUMENTS

CN 201592058 U 9/2010

OTHER PUBLICATIONS

Girgis et al. "Porosity development in activated carbons obtained from date pits under chemical activation with phosphoric acid", (2002) Microporous and Mesoporous Materials 52, 105-117.*
Vohra, "Adsorption Based Removal of Gas Phase $H_2S$ Using Date Palm Pits Based Granular Activated Carbon," Proceedings of the International Conference on New Trends in Transport Phenomena, May 1-2, 2014.

* cited by examiner

*Primary Examiner* — Frank Lawrence
(74) *Attorney, Agent, or Firm* — Oblon, McClelland, Maier & Neustadt, L.L.P.

(57) ABSTRACT

A method for removing sulfur-based gases from a gas stream comprises contacting a sulfur containing gas stream under dynamic flow conditions with granular activated carbon (GAC) to adsorb substantially all sulfur-containing gas from the gas stream. The granular activated carbon (GAC) can be derived from date palm pits.

10 Claims, 5 Drawing Sheets

METHOD FOR REMOVAL OF SULFUR-BASED GAS

CROSS-REFERENCE TO RELATED APPLICATION

This application claims the benefit of U.S. Provisional Patent Application Ser. No. 62/137,774, filed Mar. 24 2015.

BACKGROUND OF THE INVENTION

1. Field of the Invention

The present invention relates to pollution control, and particularly to a method of removal of sulfur dioxide and/OR hydrogen sulfide gases from waste gases using granular activated carbon produced from date palm pits.

2. Description of the Related Art

Sulfur based gaseous pollutants pose a serious challenge to various industries, including, for example, oil and natural gas extraction and refining industries, paper and pulp manufacturing industries, treatment plants, and manure handling plants. Sulfur based toxic gases typically present in industrial waste gases include sulfur dioxide and hydrogen sulfide. Various methods exist in the art to remove sulfur dioxide from a waste gas stream, including using molten salt mixtures, e.g., molten potassium sulfate salt mixture, using Claus reactor to convert sulfur dioxide into elemental sulfur, and adsorbing sulfur dioxide onto activated carbon or aluminum sulfate basic solution.

There is a need to provide a cost effective and environmentally acceptable method for removal of sulfur dioxide and/or hydrogen sulfide ($H_2S$) from industrial waste gases to an acceptable level without costly expenditure.

Thus, a method of removal of sulfur based toxic gases, in particular, $SO_2$ and $H_2S$ from industrial waste gases solving the aforementioned problems is desired.

SUMMARY OF THE INVENTION

A method for removing sulfur-containing gas includes contacting a sulfur gas stream under dynamic flow conditions with an adsorbent to adsorb sulfur-containing gas from the gas stream. The adsorbent can be granular activated carbon derived from date palm pits. The sulfur-containing gas can include hydrogen sulfide, sulfur dioxide, and mixtures thereof. The activated carbon derived from date palm pit has an average particle size of 1 mm and a BET surface area of between 700 $m^2/g$ to 900 $m^2/g$, preferably 822 $m^2/g$.

A method for preparing granular activated carbon derived from date palm pits includes chopping the date palm pits into particles having a size between 1.0 to 1.2 mm; mixing the particles with an acid solution to form soaked date palm pit particles; expelling gas and vapor formed from the soaked date palm pit particles; heating the date palm pit particles inside a muffle furnace to a desired temperature; transferring the tubes containing the date palm pit particles to a desiccator to form desiccated granular activated carbon; washing the desiccated granular activated carbon with water until a pH of 7 is reached; drying the desiccated granular activated carbon; and sieving the dried granular activated carbon to obtain granular activated carbon with a particle size of about 1 mm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
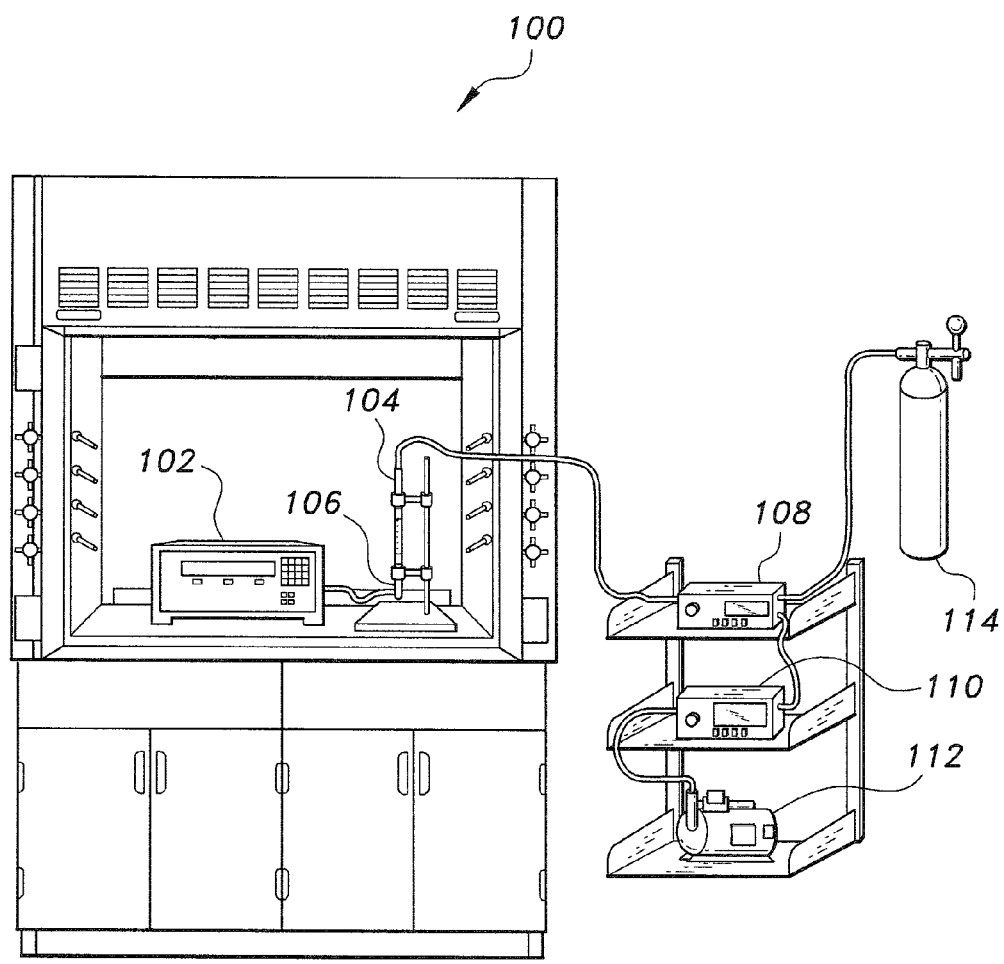
FIG. 1 is a schematic layout of a system for dynamic flow granular activated carbon (GAC) adsorption of gas phase $SO_2$ and/or $H_2S$.

A method for removing sulfur-based gases includes contacting a gas stream including sulfur under dynamic flow conditions with granular activated carbon (GAC) to adsorb sulfur-based gas from the gas stream. The gas stream can be a waste gas stream. The granular activated carbon (GAC) can be derived from agricultural waste such as date palm pits. The granular activated carbon (GAC) derived from date palm pits can adsorb all or substantially all sulfur-based gas from the gas stream. The sulfur-based gas can include hydrogen sulfide gas, sulfur dioxide gas, or mixtures thereof The activated carbon derived from date palm pit can have a $SSA_{BET}$ surface area ranging from about 700 $m^2/g$ to about 900 $m^2/g$, and is preferably about 822 $m^2/g$. The activated carbon derived from date palm pit can possess an average particle size of about 1 mm.

The granular activated carbon (GAC) can be prepared by cutting or otherwise reducing date palm pits into particles of about 1.0 mm to about 1.2 mm in size; mixing the particles with an acid solution to form soaked date palm pit particles; expelling gas and vapor from the soaked date palm pit particles; heating the date palm pit particles inside a muffle furnace to a desired temperature; transferring the date palm pit particles to a desiccator to form desiccated granular activated carbon; washing the desiccated granular activated carbon with water until a pH of 7 is reached; drying the desiccated granular activated carbon; and sieving the dried granular activated carbon to obtain granular activated carbon with a particle size of about 1 mm. The acid can be phosphoric acid. The furnace temperature can be as high as about 500° C.

Gaseous phase $H_2S$ and $SO_2$ can be removed from a gas stream using the GAC derived from date pits, under dynamic flow conditions. For example, hydrogen sulfide ($H_2S$) and sulfur dioxide ($SO_2$) gas with flow rates ranging from about 3.0 ml/min to about 4.5 ml/min and gas concentrations ranging from about 1.25 ppmv to about 2.5 ppmv can be contacted with granular activated carbon packed in a dynamic continuous flow column with a bed depth of 1 cm to 8 cm. The sulfur-based gas can be contacted with the GAC at room temperature or other suitable temperature. The breakthrough for $H_2S$ (when the effluent $H_2S$ concentration is approximately 5% of influent $H_2S$ concentration) can be at about 80 minutes while the exhaustion (when the effluent $H_2S$ concentration is approx. 95% of influent $H_2S$ concentration) can be at about 1720 minutes. The breakthrough for the $SO_2$ (when the effluent $SO_2$ concentration is approximately 5% of influent $SO_2$ concentration) can be at about 6 min while the column exhaustion (when the effluent $SO_2$ concentration is approx. 95% of influent $SO_2$ concentration) can be at about 425 min.

As used herein, the term $SSA_{BET}$ refers to the specific surface area based on Brunauer-Emmett-Teller (BET) theory. BET theory is used for determination of surface area and for pore size distribution.

Use of granular activated carbon (GAC) derived from date pits for the adsorption of gaseous phase $H_2S$ and $SO_2$ can be particularly useful for countries with large scale date palm fruit production. Such countries can use an otherwise agricultural waste material that has to be disposed to solve various pollution problems in a win-win situation. In addition, such countries can also benefit from the establishment of locally based industries for the production of granular activated carbon. This will reduce imports, increase exports, and provide jobs for both professionals and non-professionals in the field of GAC production. Various entities including oil and natural gas extraction and refining industries, paper and pulp manufacturing, treatment plants, and manure handling plants, among others, may potentially benefit from this technology.

The following examples will further illustrate the method of preparation of granular activated carbon (GAC) from date palm pits and removal of sulfur based toxic gases using granular activated carbon produced from date palm pits, and should not be construed as specifically limiting the invention described and claimed herein.

Example 1

Preparation of Granular Activated Carbon (GAC)

Date palm pits were chopped into small particles. About 60% (weight/weight) phosphoric acid solution was mixed with the date palm pit particles at an impregnation ratio R [R=(volume-acid/weight-date pits)] of 1.6. The soaked date palm pit particles were then transferred into stainless steel tubes of 25 mm diameter and 300 mm length. The tubes included two narrow ports of 1 mm diameter at both ends to expel any gases or vapors. The respective tubes were then kept inside a muffle furnace (Lenton) which was gradually heated at a rate of 10° C./min to 500° C. After reaching the desired hold temperature value, the respective date palm pits were kept inside the furnace for a 2 hour hold time (with 0 hour being the time the furnace reaches the desired activation temperature, i.e., 500° C.). After that, the respective sample containing tubes were transferred to a desiccator. Upon cooling, the respective GAC samples were subjected to thorough washing using deionized water until the washings resulted in a pH 7.0. The washed samples were completely drained and then dried in an oven (Fisher) at 110° C. for 24 h. After this step, the GAC sample was sieved and average particle size was found to be about 1 mm (diameter). The specific surface area (SSABET) value for the prepared GAC sample was obtained employing the classical BET theory and nitrogen adsorption isotherm data. A physiosorption setup (Micromeritics 2020, USA) was employed to obtain the respective nitrogen adsorption isotherm data. The $SSA_{BET}$ (BET specific surface area) value of GAC produced from date palm pits using chemical activation method using 60% (w/w) $H_3PO_4$ solution, furnace hold temperature T=500° C., impregnation ratio R=1.6 (volume-acid/weight-date pits), and furnace hold time t=2 h, showed a $SSA_{BET}$ value of 822 m²/g.

Example 2

Dynamic Continuous Gas Flow Column Adsorption Experiments $H_2S$ and $SO_2$ gas adsorption experiments were completed using a down-flow bench scale column setup (FIG. 1) under dynamic (continuous) flow column. The gas including a sulfur-based gas was provided from a gas tank 114, which was then passed through a gas flow meter 108. Air was compressed by an air compressor 112 and then passed through a high purity air supplier and mixed with the sulfur containing gas at the gas flow meter 108. The gas mixture was then fed to a granular activated column 104 derived from date pits. The exhaust gas 106 was then analyzed by a gas analyzer 102.

The GAC column setup details were as follows: Naglec Tube #8050-0310; 6.35 mm inner diameter (1/4" I.D.)× 7.938 mm outer diameter (5/16" O.D.)×0.794 mm wall thickness (1/32"); FEP tube. The granular activated column (GAC) bed depth of 2 cm to 8 cm and 1 cm to 3 cm were used respectively for $H_2S$ and $SO_2$ adsorption experiments. Hydrogen sulfide and sulfur dioxide gas flow rates between 3.0 and 4.5 ml/min were investigated. The gas concentrations were varied between 1.25 ppmv to 2.5 ppmv. The column had an appropriate inert support at bottom, on top of which the GAC particles were placed. An inert top cover was also placed at the top of GAC bed. After this step, $H_2S$ or $SO_2$ (as the case may be) gas from the standard gas cylinder was appropriately diluted using high purity air and then passed through the GAC packed-column as shown in FIG. 1 while maintaining a down flow condition at the desired concentration. The gas flow rate was maintained employing a high quality gas flow controller (Cole Palmer, U.S.A.). Effluent gases were tested using model 450i Thermo Analyzer (Thermo Scientific, U.S.A.). The adsorption breakthrough curves were then established using respective data (for each continuous column adsorption study). These experiments were conducted at room temperature.

Example 3

Figure 2:
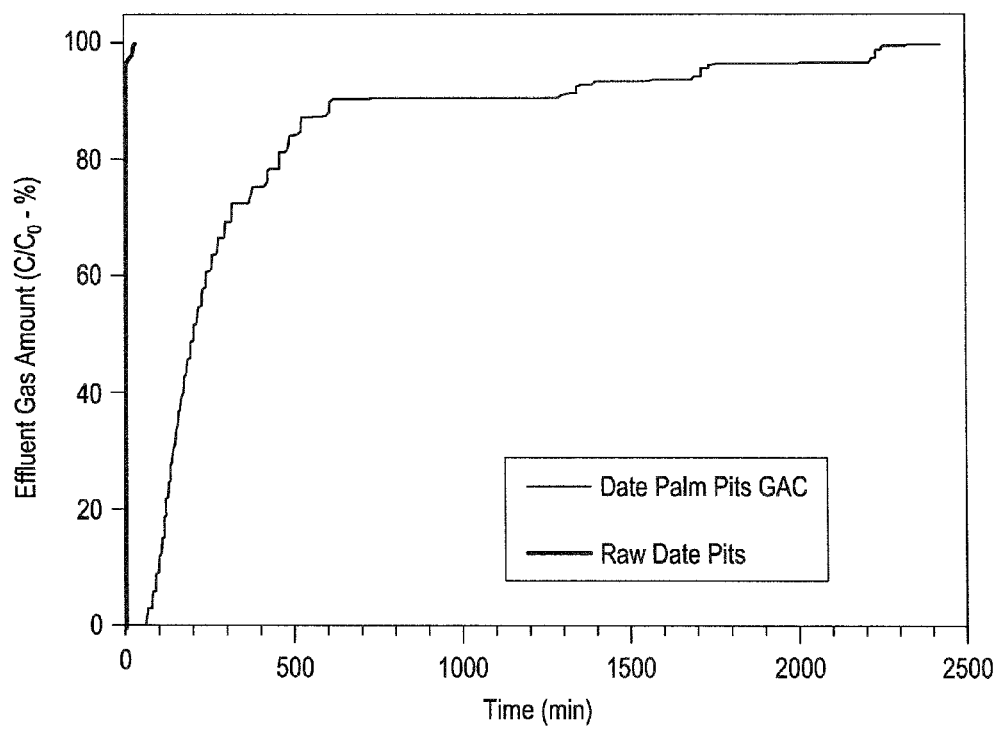
FIG. 2 is a graph showing the adsorption breakthrough curves obtained from adsorption initiated removal of gas phase $H_2S$ (Influent $H_2S$ gas concentration 1.25 ppmv, GAC bed depth 3 cm, GAC bed diameter 6.35 mm, $H_2S$ gas flow rate 3 L/min) using granular activated carbon (GAC) derived from date palm pits and raw date pits.

Comparison Column Adsorption Experiments with Activated Date Pits vs. Raw Date Pits Adsorption trials were conducted using activated date pits and raw date pits. The results of the adsorptive removal of gaseous hydrogen sulfide ($H_2S$) using both activated date pits ($SSA_{BET}$ specific surface area=822 m²/g) as well as raw date pits are shown in FIG. 2. Influent $H_2S$ gas concentration of 1.25 ppmv was passed through a 3 cm packed GAC bed (GAC bed internal diameter=6.35 mm) at a gas flow rate of 3 L/min. For the GAC produced from date palm pits, the breakthrough (when the effluent $H_2S$ concentration is approximately 5% of influent $H_2S$ concentration) was noted at about 80 minutes while the exhaustion (when the effluent $H_2S$ concentration is approx. 95% of influent $H_2S$ concentration) was noted at about 1720 minutes. For raw date pits, a breakthrough was observed in less than a minute whereas the bed was exhausted within 5 minutes. This shows that activation of date palm pits can provide a high $H_2S$ adsorption capacity.

Example 4

Comparison Column Adsorption Experiments with Activated Date Pits Versus Filtra Sorp 400

Figure 3:
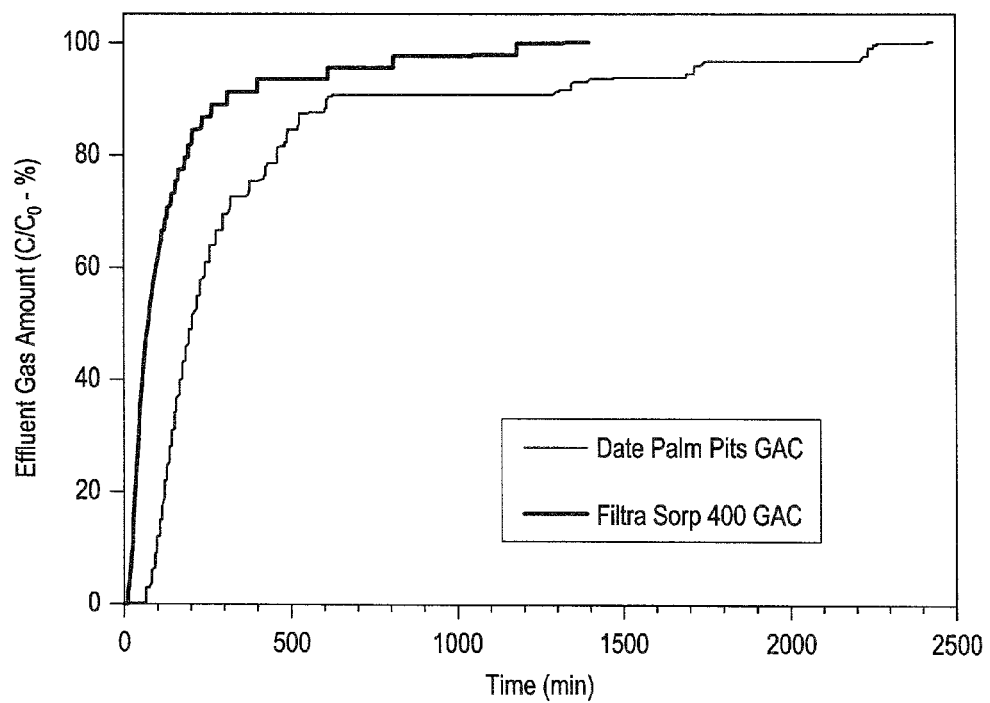
FIG. 3 is a graph showing the adsorption breakthrough curves obtained from adsorption initiated removal of gas phase $H_2S$ (Influent $H_2S$ gas concentration 1.25 ppmv, GAC bed depth 3 cm, GAC bed diameter 6.35 mm, $H_2S$ gas flow rate 3 L/min) using granular activated carbon (GAC) derived from date palm pits and a conventional GAC (Filtra Sorp 400 GAC).

To illustrate the efficiency of the GAC produced, the date palm pits based GAC was compared with Filtra Sorp 400 for gaseous $H_2S$ adsorption. The results are shown in FIG. 3. Filtra Sorp 400 is a commercially available GAC with a BET surface area between 1050 and 1200 $m^2/g$. For a gas flow rate of 1.25 ppmv through 3 cm GAC column depth at a flow rate of 3 L/min, date palm pits based GAC performed better than Filtra Sorp 400, despite the superior surface area of the commercial GAC. Filtra Sorp 400 breakthrough was observed at about 16 minutes compared to 80 minutes observed in the case of the date palm pits based GAC. The exhaustion was also noted at an earlier time for the commercial GAC (631 minutes) in comparison to the produced GAC which shows a high $H_2S$ adsorption capacity with an exhaustion time of 1720 minutes.

Example 5

Comparison of Column Adsorption Using Activated Date Pits and Raw Date Pits

Figure 4:
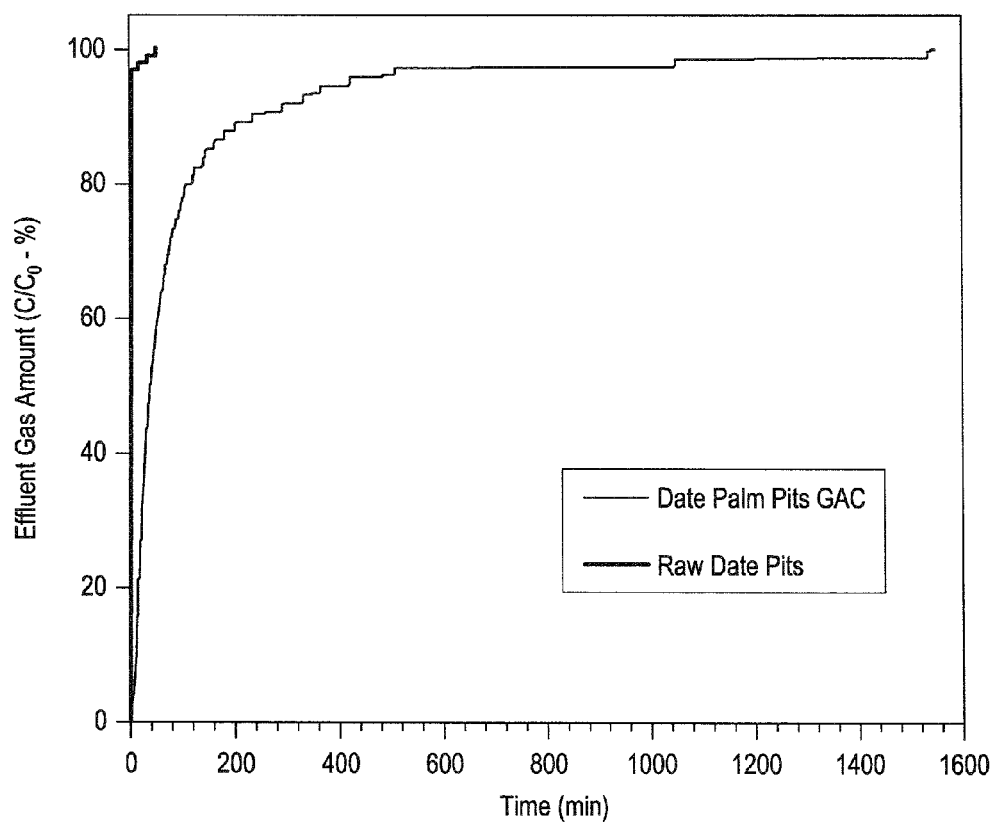
FIG. 4 is a graph showing the adsorption breakthrough curves obtained from adsorption initiated removal of gas phase $SO_2$ (Influent $SO_2$ gas concentration 1.25 ppmv, GAC bed depth 3 cm, GAC bed diameter 6.35 mm, $SO_2$ gas flow rate 3 L/min) using granular activated carbon (GAC) derived from date palm pits and raw date pits.

The adsorptive removal of sulfur dioxide ($SO_2$) using raw date pits was tested and compared with the adsorptive removal of sulfur dioxide ($SO_2$) using GAC derived from date palm pits. Experiments were conducted using an influent $SO_2$ concentration of 2.5 ppmv which was passed continuously through a GAC bed depth of 2 cm (column I.D. 6.35 mm). A break through (when the effluent $SO_2$ concentration is approx. 5% of influent $SO_2$ concentration) was observed at about 6 min for the date palm pits based GAC. Furthermore, column exhaustion (when the effluent $SO_2$ concentration is approx. 95% of influent $SO_2$ concentration) was noted at about 425 min. Similar to the $H_2S$ results, comparison of the activated and raw date pits showed date palm pits based GAC has a very high $SO_2$ adsorption capacity as depicted in FIG. 4. An early breakthrough was observed for the raw date palm pits as well as exhaustion with insignificant $SO_2$ adsorption capacity Example 6

Comparison of Column Adsorption using Activated Date Pits and Filtra Sorp 400

Figure 5:
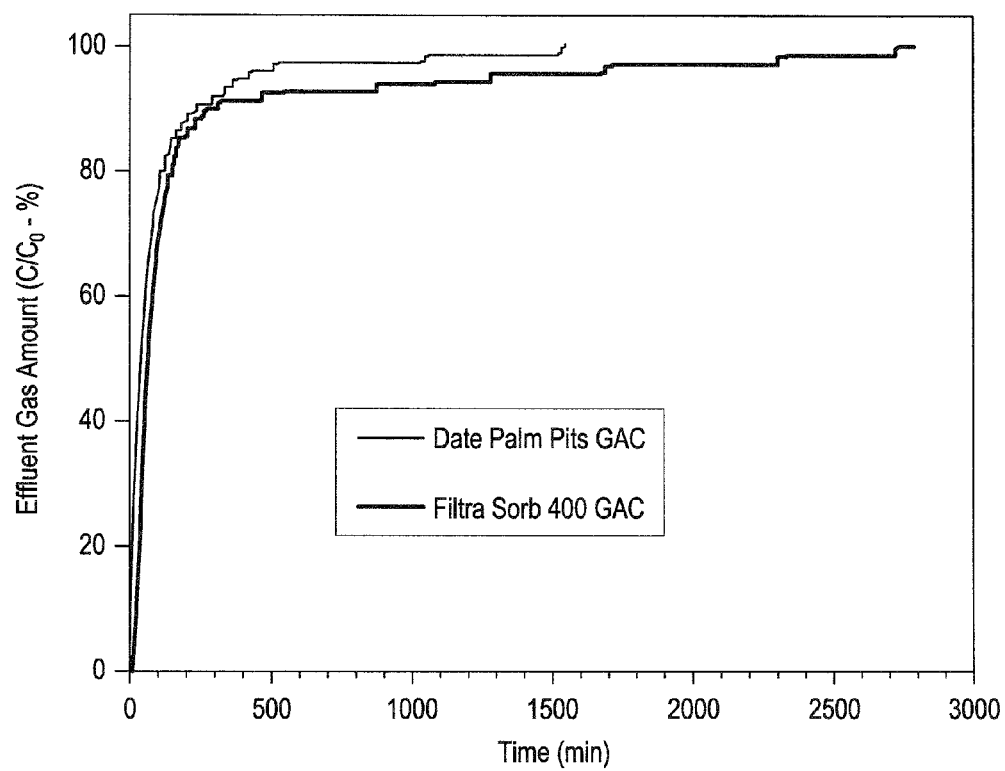
FIG. 5 is a graph showing the adsorption breakthrough curves obtained from adsorption initiated removal of gas phase $SO_2$ (Influent $SO_2$ gas concentration 1.25 ppmv, GAC bed depth 3 cm, GAC bed diameter 6.35 mm, $SO_2$ gas flow rate 3 L/min) using granular activated carbon (GAC) derived from date palm pits and a conventional GAC (Filtra Sorp 400 GAC).

The efficiency of date palm pits based GAC was also compared with Filtra Sorp 400, for gaseous $SO_2$ removal and respective results are given in FIG. 5. Comparing the removal of gaseous $SO_2$, under same conditions, the date palm pits based GAC show a relatively earlier breakthrough (6 minutes) and exhaustion time (425 minutes) in comparison to Filtra Sorp 400 (breakthrough=18 minutes and exhaustion=1298 minutes). However, the adsorption capacity of date palm based GAC was good for the adsorption of gaseous $SO_2$ in relation to its $SSA_{BET}$ specific surface area of 822 $m^2/g$. In summary, the results from the present work show that granular activated carbon (GAC) produced from date palm pits agricultural waste can be successfully employed for the adsorptive removal of gaseous hydrogen sulfide and sulfur dioxide.

It is to be understood that the present invention is not limited to the embodiments described above, but encompasses any and all embodiments within the scope of the following claims.

We claim:

1. A method for removal of sulfur-based gas, comprising:
providing granular activated carbon (GAC) derived from date palm pits;
contacting a gas stream including a sulfur-based gas under dynamic flow conditions with the granular activated carbon (GAC) derived from date palm pits; and
adsorbing the sulfur-based gas from the gas stream by the granular activated carbon (GAC) derived from date palm pits.

2. The method for removal of sulfur-based gas according to claim 1, wherein the granular activated carbon (GAC) derived from date palm pits is provided in a dynamic continuous flow column.

3. The method for removal of sulfur-based gas according to claim 2, wherein the granular activated carbon (GAC) derived from date palm pits has a bed depth of 1 cm to 8 cm inside the column.

4. The method for removal of sulfur-based gas according to claim 1, wherein the sulfur-based gas comprises at least one of hydrogen sulfide and sulfur dioxide.

5. The method for removal of sulfur-based gas according to claim 1, wherein the granular activated carbon (GAC) derived from date palm pits has a BET surface area ranging from around 700 $m^2/g$ to around 900 $m^2/g$.

6. The method for removal of sulfur-based gas according to claim 1, wherein the granular activated carbon (GAC) derived from date palm pits has an average particle size of 1 mm.

7. A method of preparing granular activated carbon (GAC) derived from date palm pits, comprising:
providing date palm pit particles;
mixing the date palm pit particles with an acid solution to form soaked date palm pit particles;
heating the date palm pit particles;
transferring the date palm pit particles to a desiccator to form desiccated granular activated carbon;
washing the desiccated granular activated carbon with water until a pH of 7 is reached;
drying the desiccated granular activated carbon after washing; and
sieving the dried granular activated carbon to obtain granular activated carbon with a particle size of about 1 mm.

8. The method of preparing granular activated carbon (GAC) derived from date palm according to claim 7, wherein the acid is phosphoric acid.

9. The method of preparing granular activated carbon (GAC) derived from date palm pits according to claim 7, wherein the date palm pit particles are heated to a temperature of about 500° C.

10. Granular activated carbon obtained by the method of claim 7.

* * * * *